(12) United States Patent
Xie et al.

(10) Patent No.: US 11,989,398 B2
(45) Date of Patent: May 21, 2024

(54) DIGITAL CONTENT VIEW CONTROL SYSTEM

(71) Applicant: eBay Inc., San Jose, CA (US)

(72) Inventors: Feng Xie, Shanghai (CN); Pei Wang, Shanghai (CN); Kun Yu, Shanghai (CN); Xiaojie Zang, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/508,151

(22) Filed: Oct. 22, 2021

(65) Prior Publication Data

US 2023/0127460 A1    Apr. 27, 2023

(51) Int. Cl.
| | |
|---|---|
| *G06F 3/04845* | (2022.01) |
| *G06F 3/04842* | (2022.01) |
| *G06T 15/20* | (2011.01) |
| *G06T 19/20* | (2011.01) |

(52) U.S. Cl.
CPC ...... *G06F 3/04845* (2013.01); *G06F 3/04842* (2013.01); *G06T 15/20* (2013.01); *G06T 19/20* (2013.01); *G06T 2219/028* (2013.01); *G06T 2219/2004* (2013.01)

(58) Field of Classification Search
CPC . G06F 3/04845; G06F 3/04842; G06T 15/20; G06T 19/20; G06T 2219/028; G06T 2219/2004
USPC ........................................................ 715/764
See application file for complete search history.

(56) References Cited

U.S. PATENT DOCUMENTS

| | | | | |
|---|---|---|---|---|
| 5,796,373 | A  * | 8/1998 | Ming-Yen | H04N 13/167 348/E13.059 |
| 6,577,330 | B1 * | 6/2003 | Tsuda | G09G 5/14 715/781 |
| 8,405,652 | B1 * | 3/2013 | Kalaidjian | G06F 40/106 345/419 |
| 10,187,568 | B1 * | 1/2019 | Tran | H04N 13/194 |

(Continued)

FOREIGN PATENT DOCUMENTS

| | | | |
|---|---|---|---|
| JP | 2005267655 | A   | 9/2005 |
| JP | 2012256254 | A * | 12/2012 |

(Continued)

OTHER PUBLICATIONS

EP22201270.0, "Extended European Search Report", EP Application No. EP22201270.0, dated Mar. 28, 2023, 9 pages.

(Continued)

*Primary Examiner* — Hwei-Min Lu
(74) *Attorney, Agent, or Firm* — FIG. 1 Patents

(57) ABSTRACT

Digital content view control is described as leveraging a hierarchical structure of objects defined within the digital content to control how those objects are rendered in a user interface. In one example, a user input is received to display a view of objects within digital content displayed in a user interface. In response, a data query module is configured to fetch data describing a hierarchical structure of the digital content. From this, a z-order determination module determines a z-order of objects included with the digital content. An object view generation module is also configured to generate object views depicting the objects included in the digital content. The object views, once rendered, support an ability to view positioning of objects within the hierarchy.

20 Claims, 12 Drawing Sheets

(56) References Cited

U.S. PATENT DOCUMENTS

| | | | |
|---|---|---|---|
| 2002/0105537 A1* | 8/2002 | Orbanes | G06F 3/04815 |
| | | | 715/733 |
| 2005/0267655 A1 | 12/2005 | Gessner | |
| 2006/0161861 A1 | 7/2006 | Holecek et al. | |
| 2007/0126732 A1* | 6/2007 | Robertson | G06F 3/0481 |
| | | | 345/419 |
| 2010/0107101 A1* | 4/2010 | Shaw | G06F 3/0481 |
| | | | 715/766 |
| 2010/0131904 A1* | 5/2010 | Fong | G06F 3/0346 |
| | | | 715/863 |
| 2010/0295958 A1 | 11/2010 | Larsson et al. | |
| 2011/0187706 A1* | 8/2011 | Vesely | G06T 15/00 |
| | | | 345/419 |
| 2012/0030569 A1* | 2/2012 | Migos | G06F 3/0488 |
| | | | 715/702 |
| 2012/0063740 A1 | 3/2012 | Lee et al. | |
| 2014/0033116 A1 | 1/2014 | Jakobs et al. | |
| 2014/0354548 A1* | 12/2014 | Lee | G06F 3/0321 |
| | | | 345/166 |
| 2015/0082180 A1 | 3/2015 | Ames et al. | |
| 2015/0130894 A1* | 5/2015 | Holzer | G06F 3/04842 |
| | | | 348/36 |
| 2015/0149965 A1* | 5/2015 | Bakhash | G06F 3/04815 |
| | | | 715/836 |
| 2015/0346981 A1 | 12/2015 | Johnson et al. | |
| 2016/0198097 A1 | 7/2016 | Yewdall et al. | |
| 2016/0203634 A1* | 7/2016 | Vesely | G06F 3/0482 |
| | | | 345/419 |
| 2019/0243153 A1* | 8/2019 | Haseltine | G02B 30/56 |
| 2020/0066015 A1* | 2/2020 | Killeen | G06T 11/60 |
| 2020/0301549 A1 | 9/2020 | Aroche Martinez et al. | |
| 2022/0353078 A1* | 11/2022 | Etwaru | G06F 21/6218 |

FOREIGN PATENT DOCUMENTS

| | | |
|---|---|---|
| JP | 2013016144 A * | 1/2013 |
| WO | 2012169097 A1 | 12/2012 |

OTHER PUBLICATIONS 2022-167580 , "Foreign Office Action", JP Application No. 2022-167580, Dec. 26, 2023, 5 pages.

* cited by examiner

902 Receive an input to display digital content having a plurality of objects in perspective

904 Obtain data describing a hierarchical structure of the plurality of objects from the digital content

906 Determine a z-order of the plurality of objects, one to another, based on the hierarchical structure

908 Generate a plurality of perspective object views of the plurality of objects, respectively

910 Arrange and space the plurality of perspective object views, one to another, according to the z-order

912 Display the arranged plurality of perspective object views in the user interface

Fig. 9

DIGITAL CONTENT VIEW CONTROL SYSTEM

BACKGROUND

Digital content is configurable to include a multitude of objects as part of digital images, design of a user interface, webpages, digital multimedia, digital documents, and so forth. Oftentimes, this multitude of objects include overlaps, are nested within each other, and so forth. As such, this presents a challenge to conventional techniques that are supported by computing devices to select and interact with individual objects within the digital content.

Consider an example of a collection of objects that are visually nested and layered within each other, e.g., to depict collections of device components in a user interface such as semiconductor chips on a circuit board within a housing. In order to select a particular one of these objects in the user interface using conventional techniques, a series of user inputs are provided at a same location in the user interface to select a particular object. This causes the computing device to "cycle through" different objects until an object of interest is indicated as selected. Any mistake in this series of selections, however, forces the user to "start over" and repeat through the cycle to achieve a desired selection. This challenge is further exacerbated when zooming to a particular object such that other objects that are nested as part of the collection are not directly viewable in the user interface. This results in user frustration and inefficient use of computational resources caused by these repeated selections.

SUMMARY

Digital content view control is described as leveraging a hierarchical structure of objects defined within the digital content to control how those objects are rendered in a user interface. In one example, a user input is received to display a view of objects within digital content displayed in a user interface. In response, a data query module is configured to fetch data describing a hierarchical structure of the digital content. From this, a z-order determination module determines a z-order of objects included with the digital content, e.g., by examining a hierarchy defined by tags within the markup language. An object view generation module is also configured to generate object views depicting the objects included in the digital content. The object views, once rendered, support an ability to view positioning of objects within the hierarchy, e.g., to indicate overlaps, nesting, and so forth.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 9 is a flow diagram depicting a procedure in an example implementation of digital content view control of objects.

DETAILED DESCRIPTION

Overview

Figure 1:
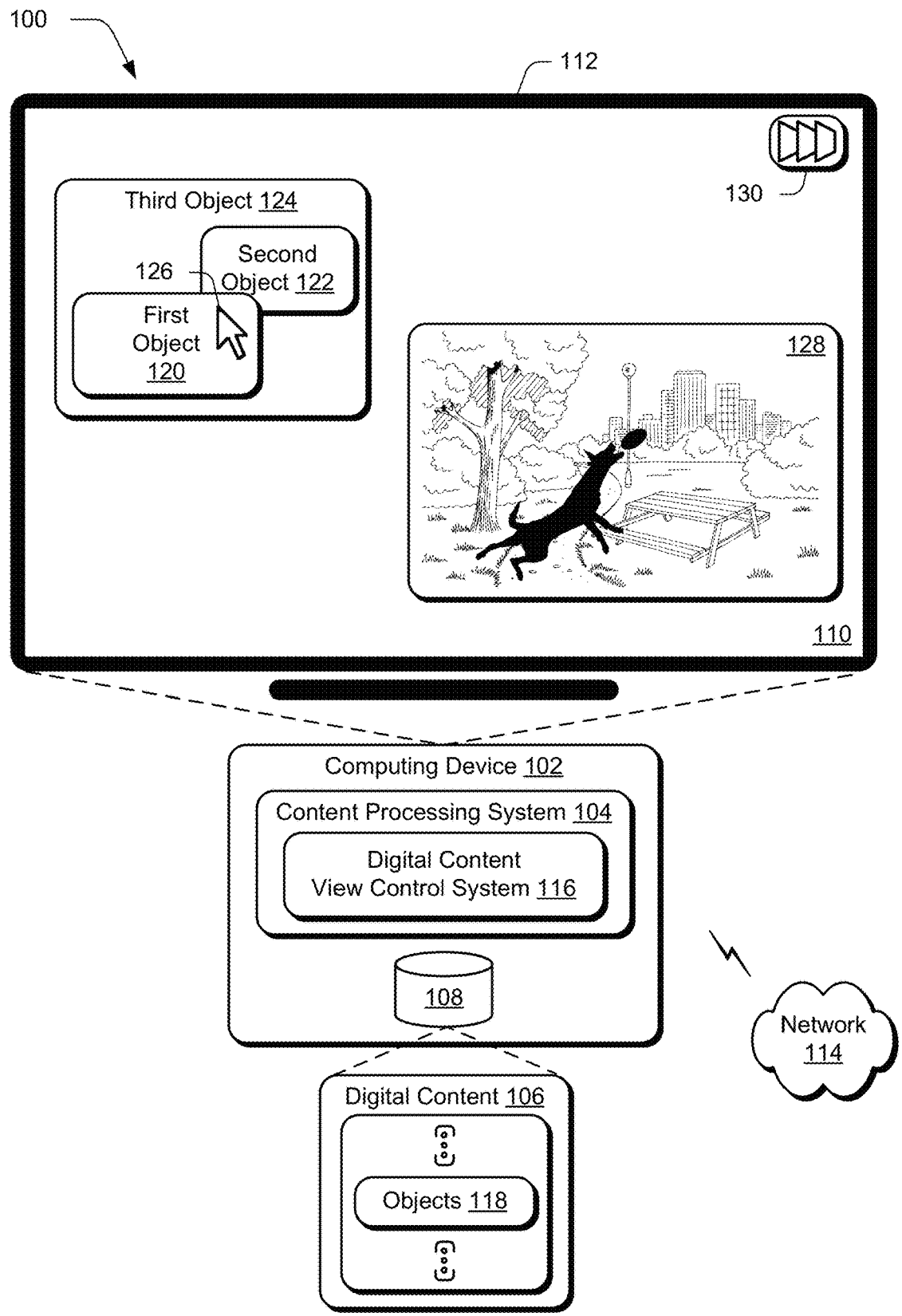
FIG. 1 is an illustration of an environment in an example implementation that is operable to employ digital content view control techniques described herein.

The complexity of digital content and corresponding uses for that content are ever increasing. Consider an example of evolution of digital content configured as a webpage. Initially, webpages included a simple body of text and maybe a title. As webpages evolve, a multitude of graphics, art, buttons, portions that support streaming, and so on are included in everyday examples. Consequently, however, creation, editing, and interaction with this digital content is further complicated by overlaps, nesting, and arrangement of objects used to form the digital content. This results in user frustration and inefficient use of computational resources as part of editing and interacting with this digital content.

Accordingly, digital content view control techniques and systems are described to control how objects within digital objects are viewed to support navigation, editing, and arrangement of the objects. This results in increased efficiency in user interaction and computational resource consumption. Continuing the webpage example above, consider an example in which the webpage includes multiple objects that overlap, are nested within each other (e.g., a boundary of a first object is included within a boundary of a second object), and so on. Conventional techniques used to select a particular object typically involved repeated selection (e.g., at a single location within the user interface) to cycle through the different objects overlapping the location until a desired object is indicated as selected. This conventional technique is thus inefficient, prone to error, and results in user frustration.

In the following, however, a digital content view control system is configured to leverage a hierarchical structure of objects defined within the digital content to control how those objects are rendered in a user interface. For the webpage example, a markup language (e.g., HTML) is used to define what different objects "are" in the digital content as well as presentation semantics describe how to present the objects of the digital content. As part of this, the markup language defines a hierarchical structure of objects in relation to each other within the digital content, e.g., through the use of tags. The digital content view system is configured to examine this structure to determine a z-order arrangement of objects that is used as a basis to represent the objects as spaced within a user interface, e.g., as an exploded view. An exploded view, for instance, depicts a relationship and order of objects based on the relationship and order of the objects from the digital content as separated by a distance.

In one example, a user input is received to display a view of objects within digital content displayed in a user interface. The user input is received responsive to selection of an option in the user interface to switch from a flat planar view (e.g., a linear perspective) in which the objects are displayed as overlapping in a single plane in the user interface to a multipoint perspective view of the objects.

In response, a data query module is configured to fetch data describing a hierarchical structure of the digital content, e.g., a markup language. From this, a z-order determination module determines a z-order of objects included with the digital content, e.g., by examining a hierarchy defined by tags within the markup language.

An object view generation module is also configured to generate object views depicting the objects included in the digital content. In one example, the object views are perspective object views based on a multipoint perspective. An object view generation module, for instance, determines a direction of a perspective for a multipoint perspective defining a plane between a viewpoint and a vanishing point. The direction may be specified in a variety of ways, such as via a user input, predefined (e.g., forty-five degrees on a Y axis), and so forth. The objects are then distorted to follow this plane and are spaced apart in the user interface. The spacing is also definable in a variety of ways, such as predefined amount, user specified amount (e.g., via a control such as a slider), and so forth.

The object views, once rendered, support an ability to view positioning of objects within the hierarchy, e.g., to indicate overlaps, nesting, and so forth. The objects views support a variety of functionality, examples of which include navigation directly to a corresponding object (thereby avoiding conventional cyclic selection techniques), editing of the objects, rearrangement of the objects in the hierarchy which is then propagated "back" to also edit the markup language, and so forth. As a result, the digital content view control techniques and systems described herein overcome challenges of conventional techniques with increased user and computational efficiency. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital content view control techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 12.

The computing device 102 is illustrated as including a content processing system 104. The content processing system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. Although illustrated as implemented locally at the computing device 102, functionality of the content processing system 104 is also configurable as whole or part via functionality available via the network 114, such as part of a web service or "in the cloud." Examples of digital content 106 include digital images, digital media, webpages, digital documents, and any other form of content that is configured for rendering and display by the display device 112 in the user interface 110.

An example of functionality incorporated by the image processing system 104 to process the digital content 106 is illustrated as a digital content view control system 116. This system is configured to control interaction with objects 118 included as part of the digital content 106. Examples of objects 118 include vector objects, raster objects, text, digital images, representations of executable functionality that is selectable via the representations (e.g., buttons, controls, sliders, radial dials, media controls), and so forth.

As a number of objects 118 included in the digital content 106 increases, so too does the complexity of editing and interacting with these objects 118. In a first such example, a collection of overlapping first, second, and third objects 120, 122, 124 is shown, e.g., as layers in a digital image. The first object 120 partially overlaps the second object 122. The first and second objects 120, 122 overlap the third object 124. This reflects a z-ordering outward from third object 124 to the second object 122 to the first object 120. Selection of individual objects is complicated by this overlap. A cursor, for instance, is illustrated as disposed at a single location 126 in the user interface 110. Conventional techniques to select any one of the first, second, and third objects 120, 122, 124 involved repeated inputs until an indication is output in the user interface 110 of a desired selection, which is prone to error. This challenge is further complicated by complex digital content 106, such as the digital image 128 of a park scene with a picnic table and dog catching a ball. It is difficult in this situation, for instance, to determine which objects are selectable separately (e.g., is the dog, picnic bench, lamp post or tree selectable?), select particular objects, accurately determine a correct z-ordering of the objects, and so forth.

Accordingly, the digital content view control system 116 includes an option 130 that is user selectable to initiate a view of the objects 118, separately, that is indicative of a z-ordering of the objects as well as which object are included together and/or disposed separately in the user interface 110. Other examples are also contemplated that do not involve selection of the option 130, e.g., for sensor-based techniques as described in relation to FIGS. 10 and 11.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Digital Content View Control

Figure 2:
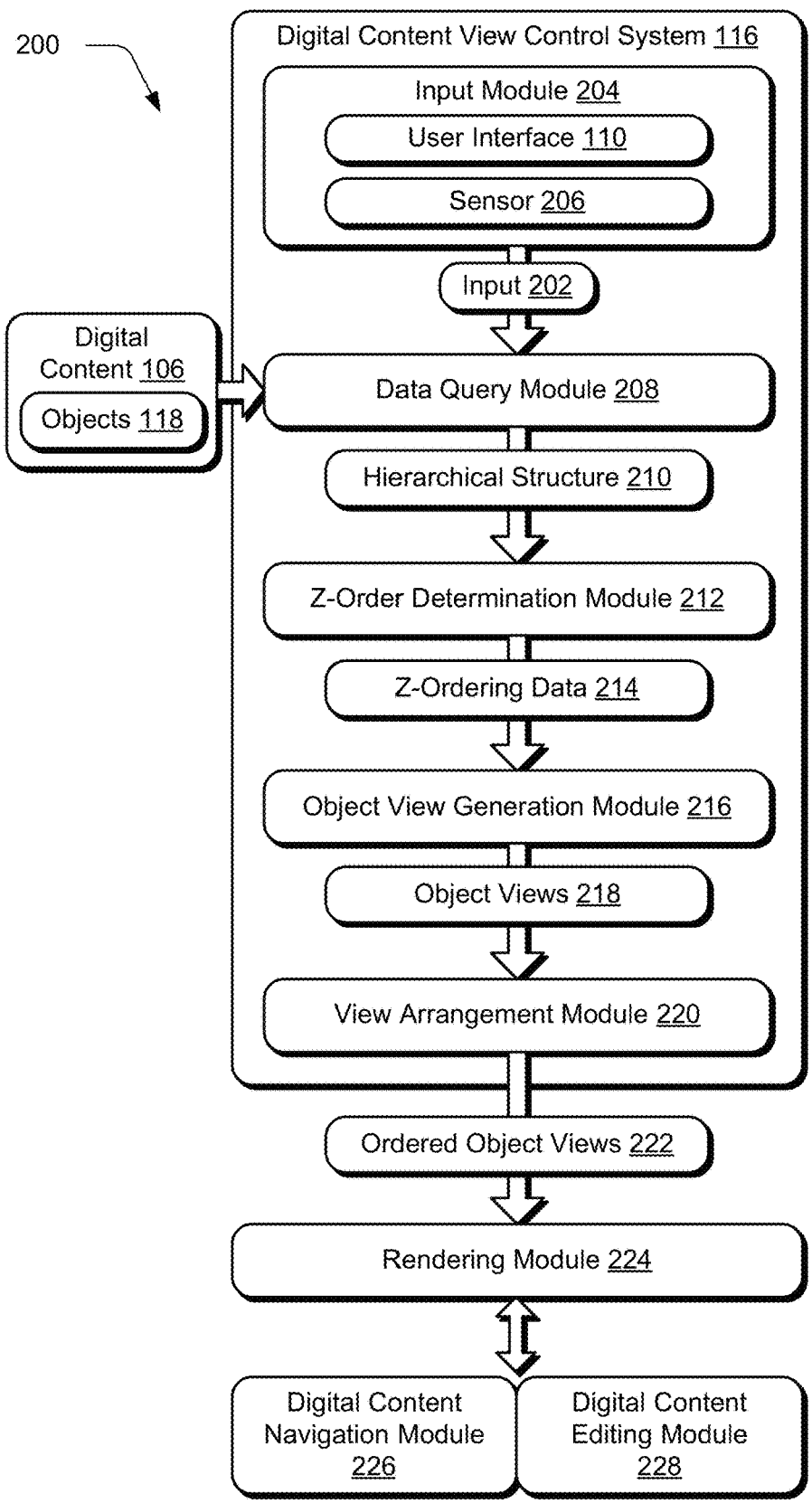
FIG. 2 depicts a system in an example implementation showing operation of a digital content view control system of FIG. 1 in greater detail.
Figure 3:
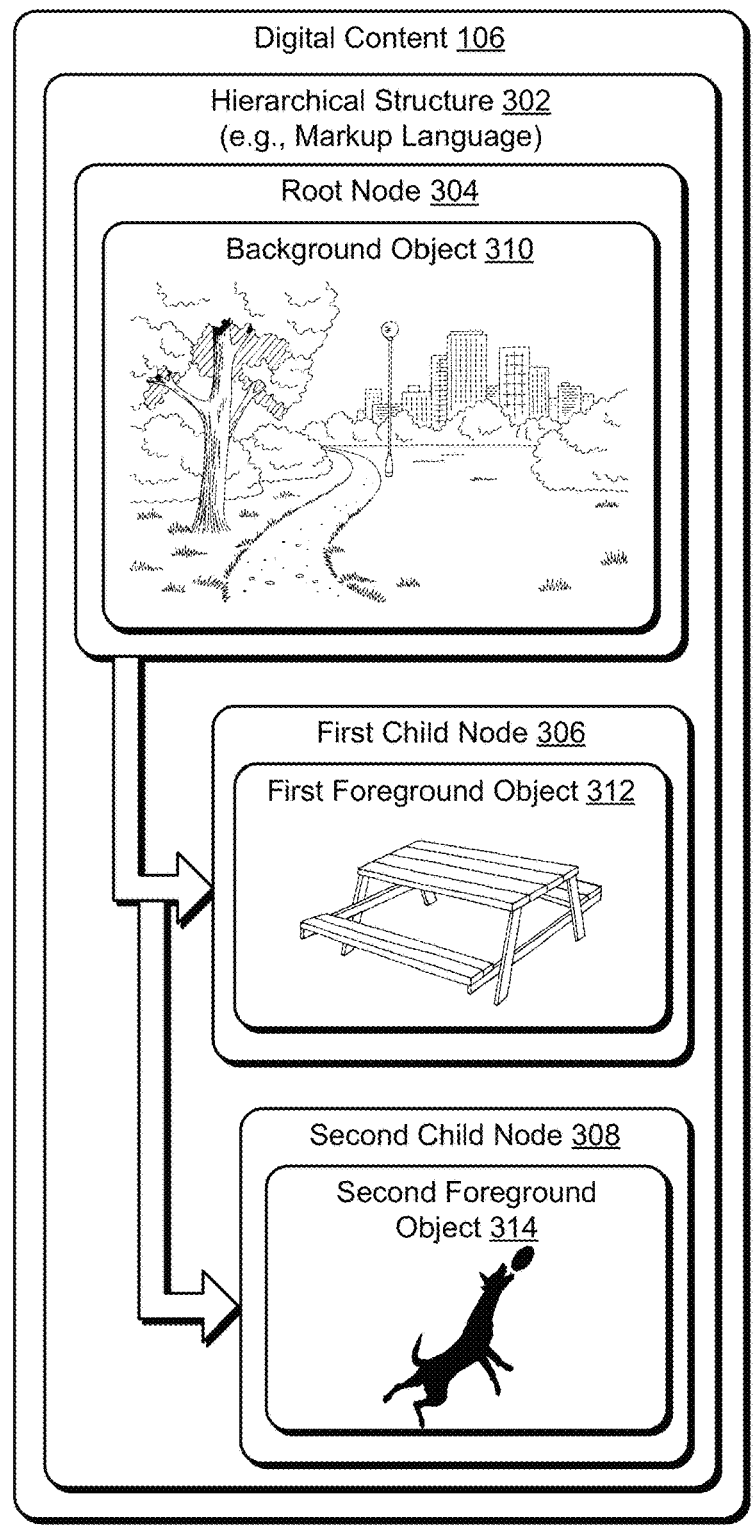
FIG. 3 depicts an example of a hierarchical structure of objects included as part of digital content.
Figure 4:
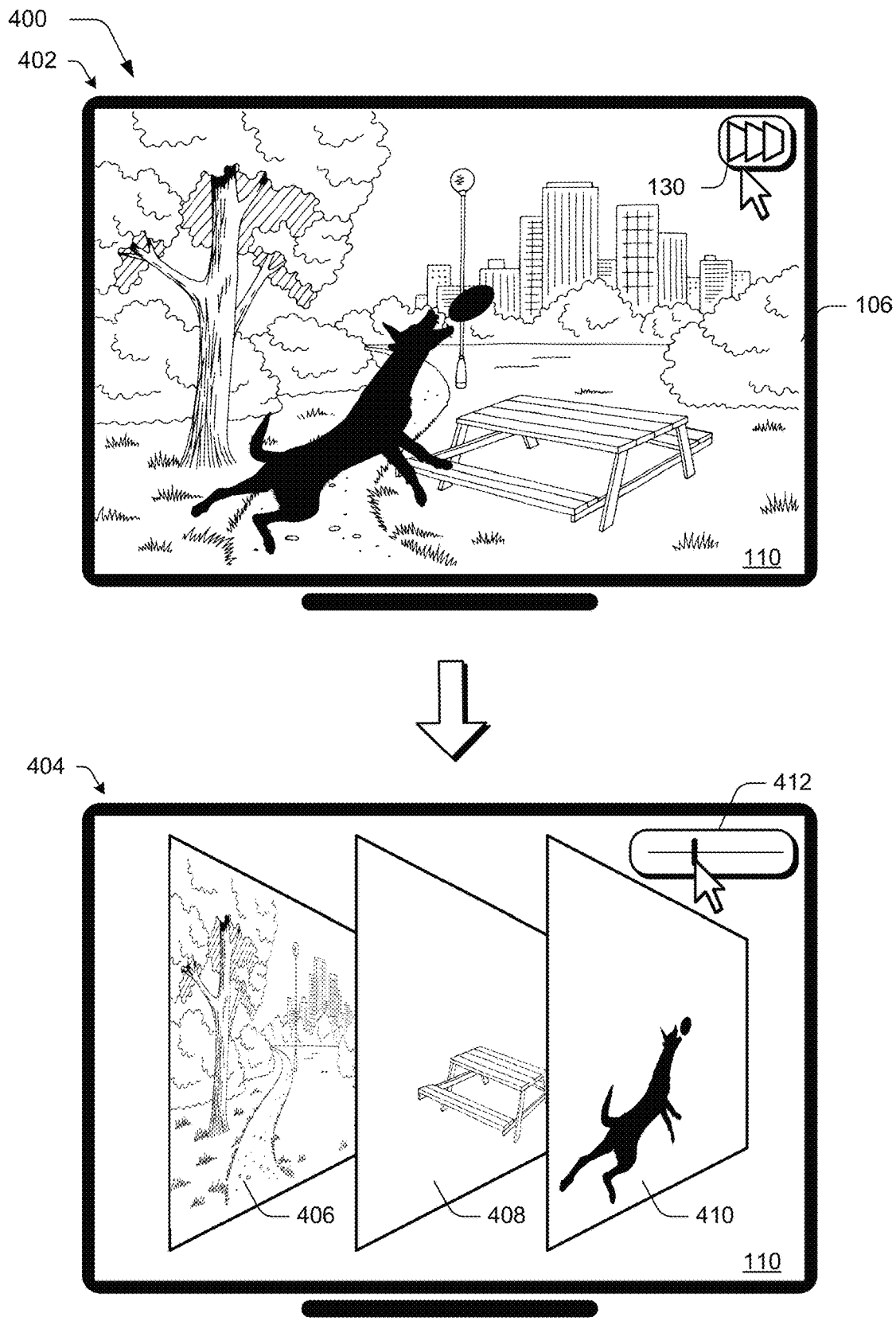
FIG. 4 depicts an example shown using first and second stages in which an option is selected in a user interface that renders digital content in a linear perspective (i.e., flat planar view) to cause output of a multipoint perspective view of objects included in the digital content.
Figure 5:
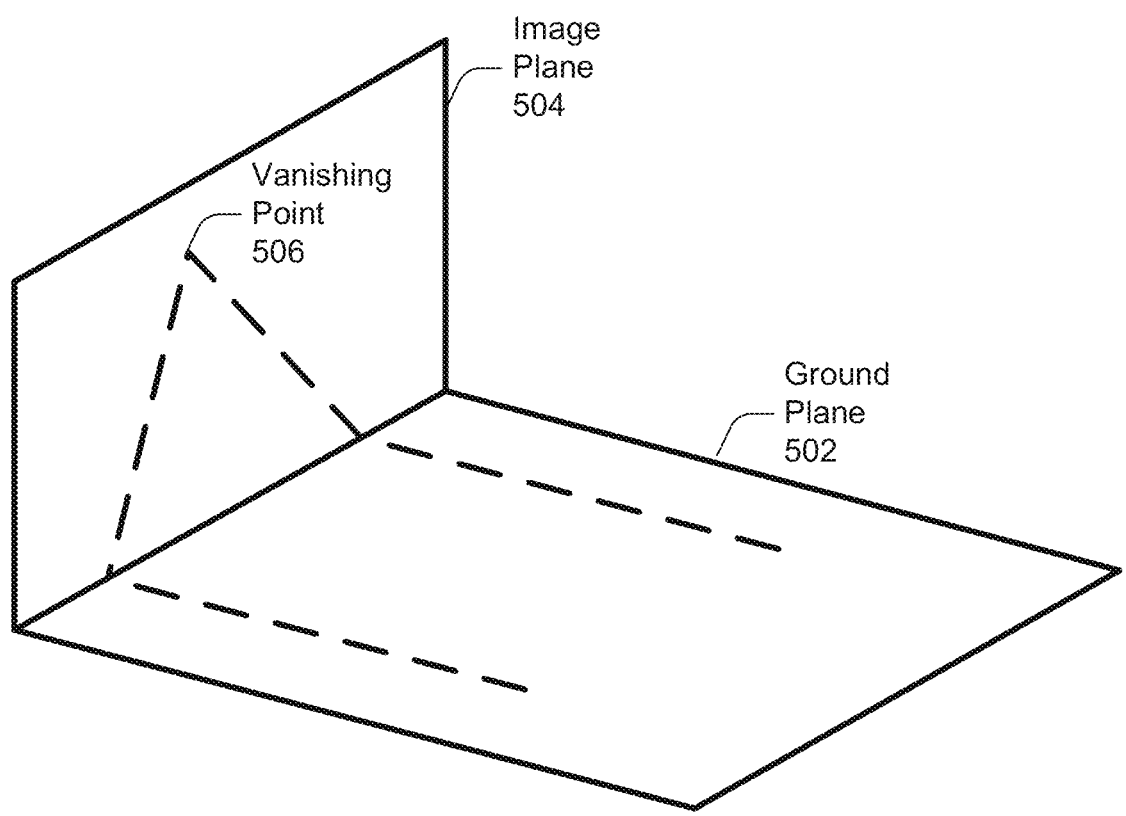
FIG. 5 depicts an example of defining a direction as part of a multipoint perspective to be used to generate perspective object views of objects included as part of digital content.
Figure 6:
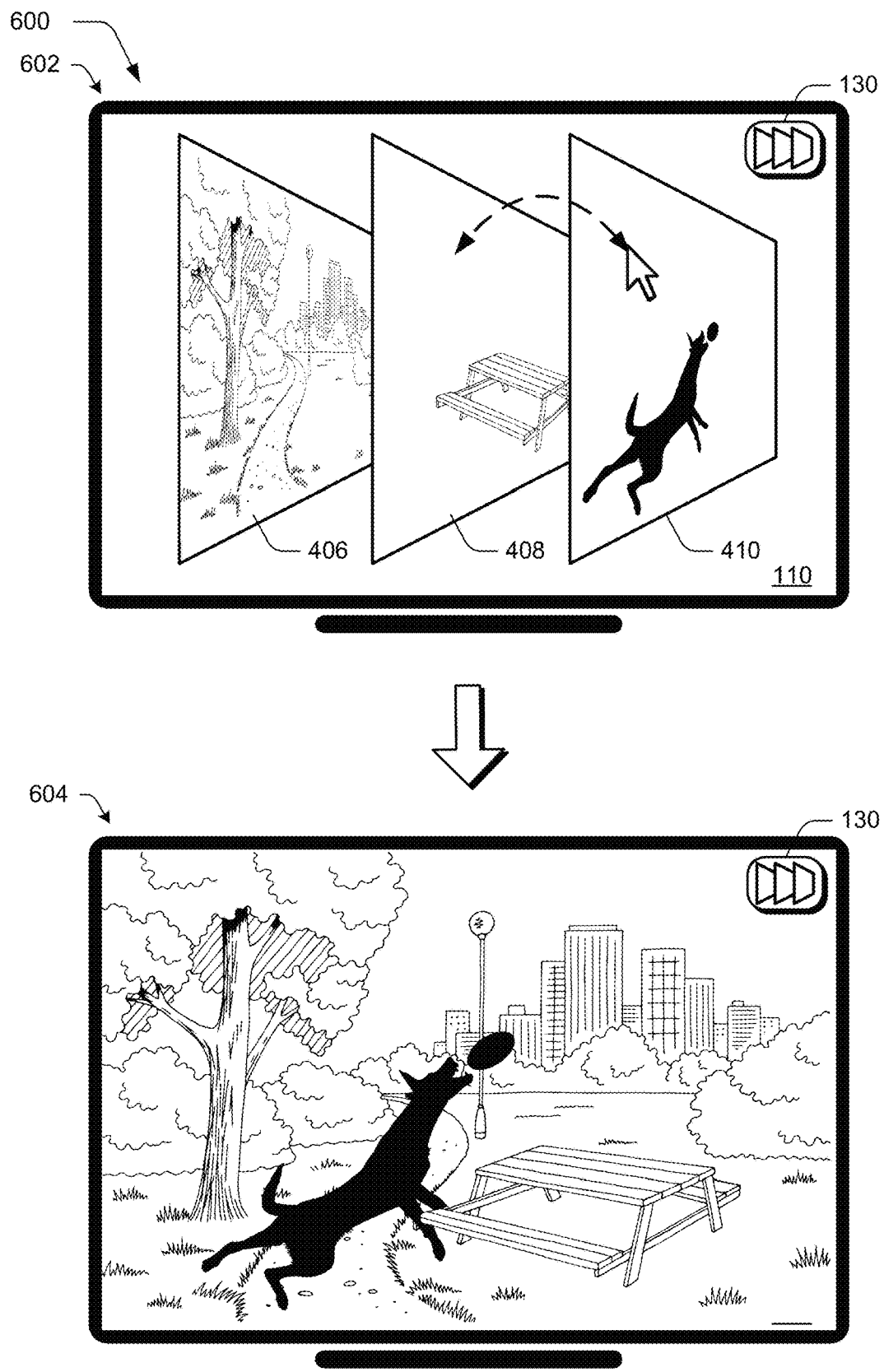
FIG. 6 depicts an example illustrated using first and second stages in which interaction with perspective object views is used to reorder objects in a z-ordering within the digital content.
Figure 7:
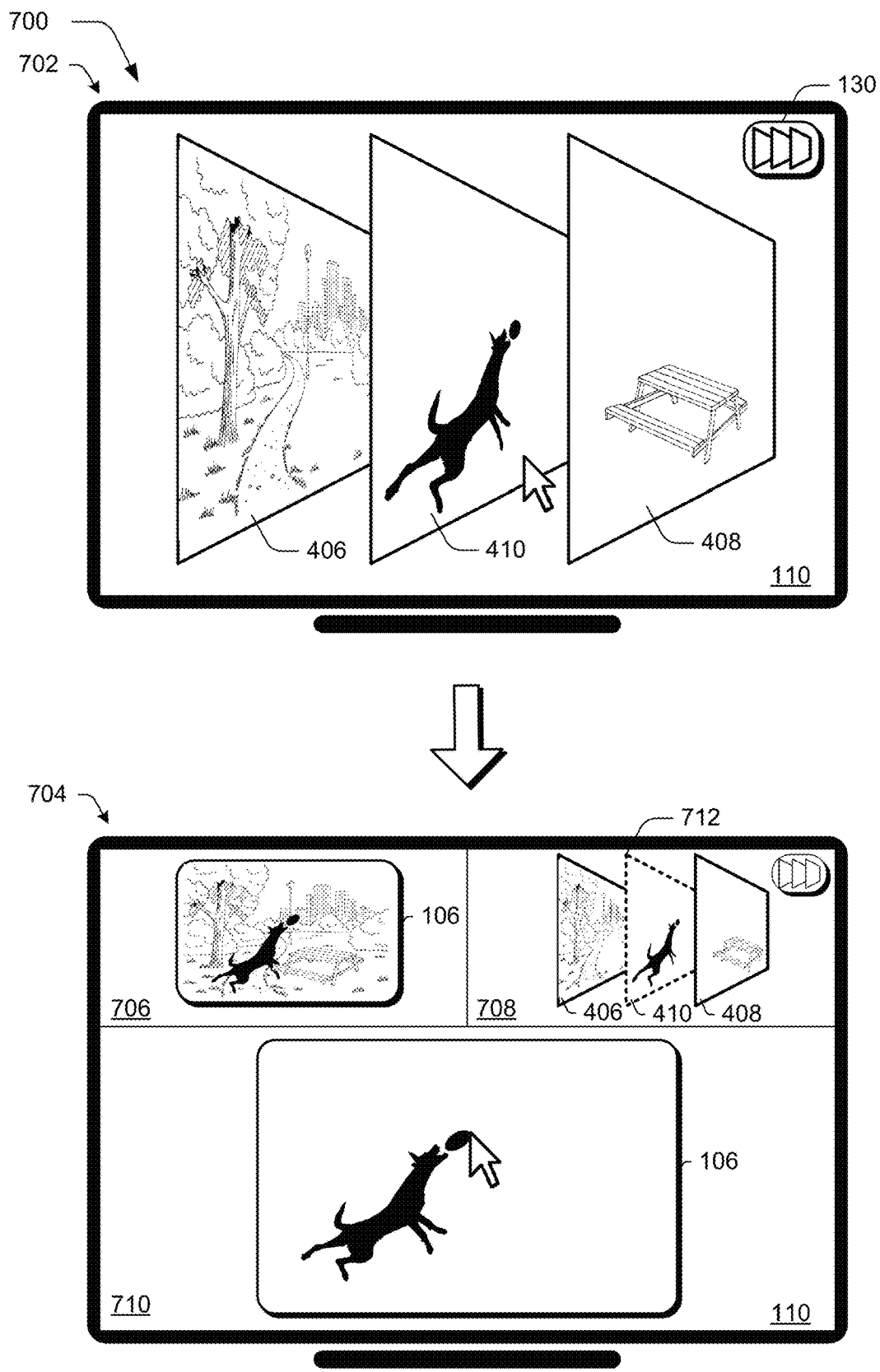
FIG. 7 depicts an example illustrated using first and second stages of editing an object selected using a corresponding perspective object view.
Figure 8:
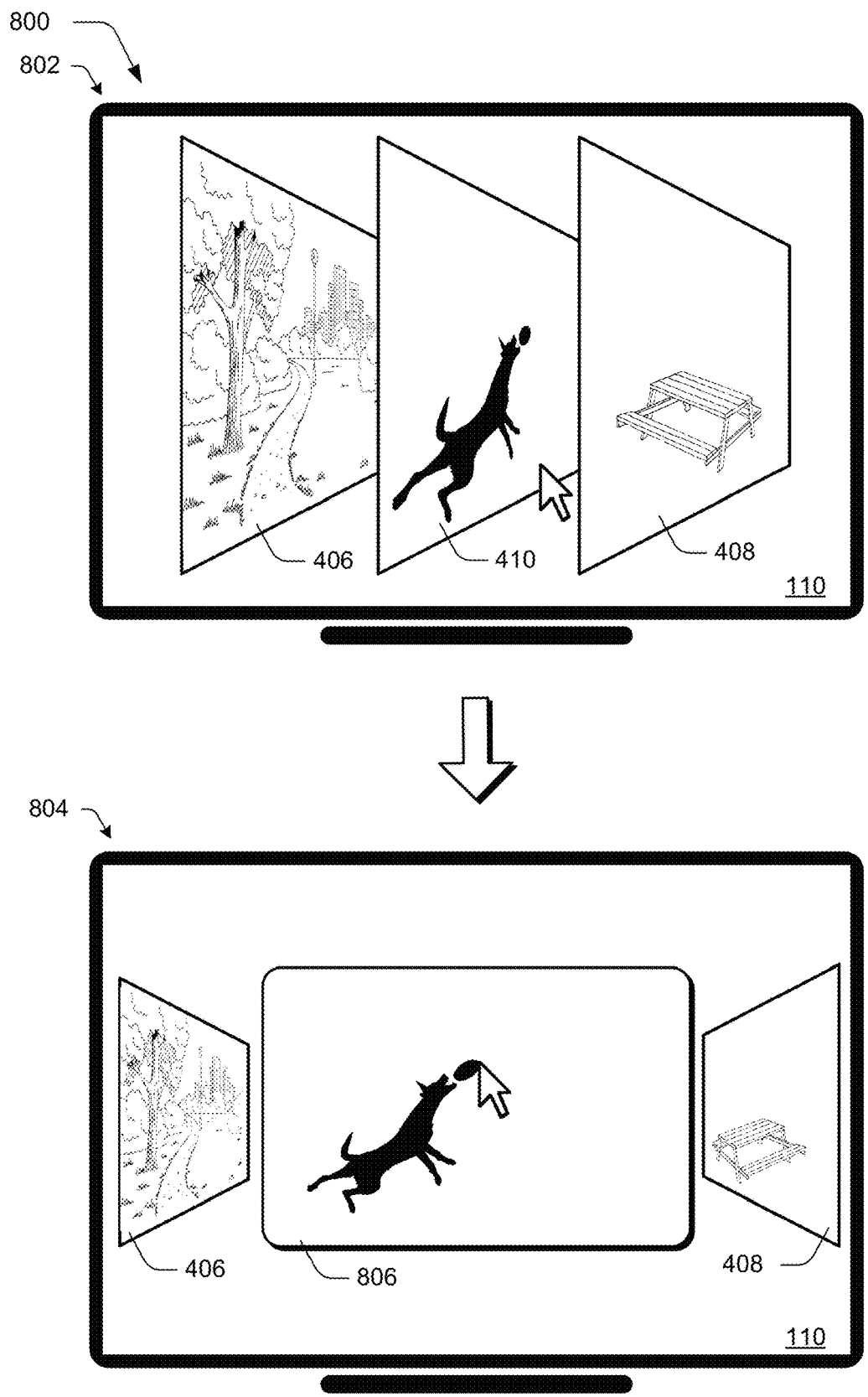
FIG. 8 depicts another example illustrated using first and second stages of editing an object selected using a corresponding perspective object view.
Figure 10:
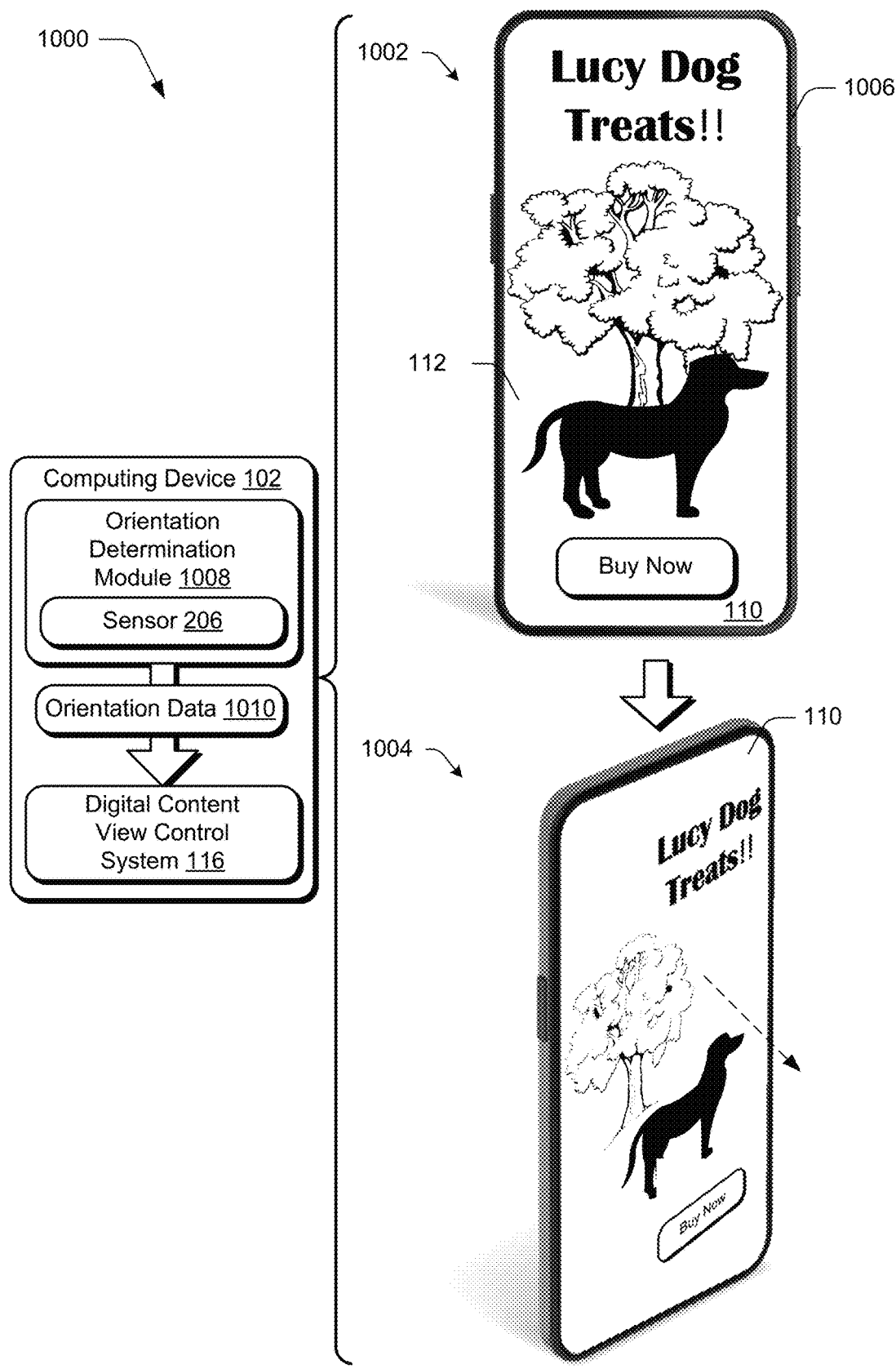
FIG. 10 depicts another example illustrated using first and second stages of use of sensor that detects orientation of the computing device to control output of different views of the objects of the digital content.
Figure 11:
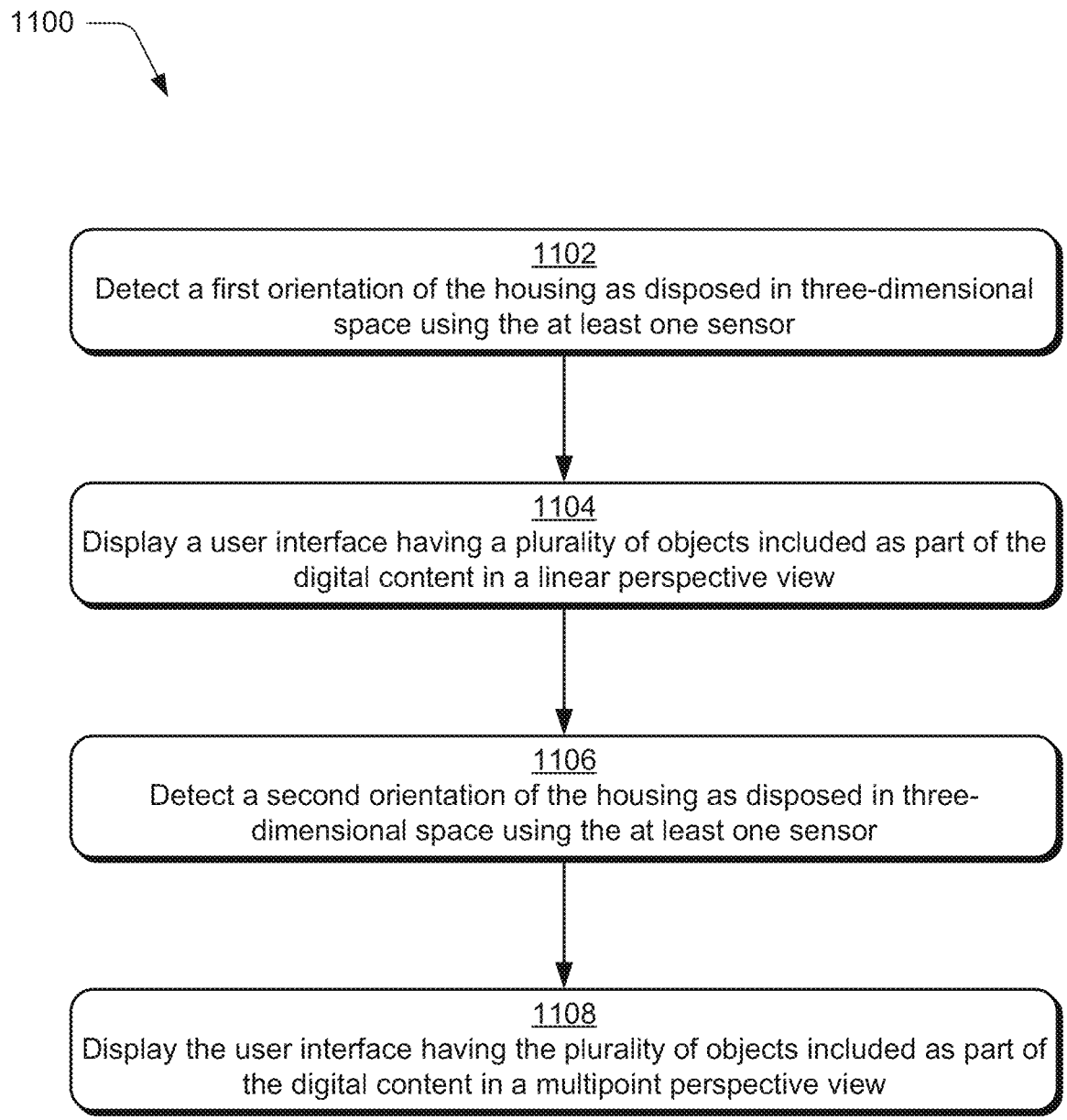
FIG. 11 is a flow diagram depicting a procedure in an example implementation of detecting orientation of a housing of a computing device using a sensor, and from this, controlling output of different views of the objects of the digital content.

FIG. 2 depicts a system 200 in an example implementation showing operation of the digital content view control system 116 of FIG. 1 in greater detail. FIG. 3 depicts an example 300 of a hierarchical structure of objects included as part of digital content 106. FIG. 4 depicts an example 400 shown using first and second stages 402, 404 in which an option 130 is selected in a user interface 110 that renders digital content 106 in a linear perspective (i.e., flat planar view) to cause output of a perspective view of objects included in the digital content 106. FIG. 5 depicts an example 500 of defining a direction for a multipoint perspective to be used to generate perspective object views of objects included as part of digital content 106. FIG. 6 depicts an example 600 illustrated using first and second stages 602, 604 in which interaction with perspective object views is used to reorder objects 118 in a z-ordering within the digital content 106. FIG. 7 depicts an example 700 illustrated using first and second stages 702, 704 of editing an object selected using a corresponding perspective object view. FIG. 8 depicts another example 800 illustrated using first and second stages 802, 804 of editing an object selected using a corresponding perspective object view. FIG. 9 depicts a procedure 900 in an example implementation of digital content view control of objects. FIG. 10 depicts another example 1000 illustrated using first and second stages 1002, 1004 of a sensor that detects orientation of the computing device 102 to control output of different views of the objects 118 of the digital content 106. FIG. 11 depicts a procedure 1100 in an example implementation of detecting orientation of a housing of a computing device 102 using a sensor, and from this, controlling outputs of different views of the objects 118 of the digital content 106.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-11.

To begin, an input 202 is received to display digital content having a plurality of objects in perspective (block 902). The input 202 may be originated by the input module 204 in a variety of ways. In a first example, the input 202 is generated responsive to user selection of the option 130 in the user interface 110. As shown at a first stage 402 of FIG. 4, an option 130 is output as part of a linear perspective (i.e., flat planar view) of objects 118 included as part of digital content 106 rendered in a user interface 110. Selection of the option 130 causes rendering of object views of the object 118 in a z-ordering as separated from each other as part of a multipoint perspective, an example of which is shown at a second stage 404 of FIG. 4.

In another example, the input 202 is originated by a sensor 206. The sensor 206, for instance, detects a change in orientation of the computing device 102, e.g., in three-dimensional space through detection of multi-axis movement. This change is used as a basis to switch from a linear perspective of the objects as shown at the first stage 402 to a multipoint perspective as shown at the second stage 404. Further discussion of the use of sensors to detect multiaxial movement is further described in relation to FIGS. 10 and 11.

Receipt of the input 202 by a data query module 208 causes the module to obtain data from the digital content 106 that describes a hierarchical structure 210 of the plurality of objects 118 (block 904) as defined within the digital content 106. An example of a digital content 106 having a hierarchical structure 302 defined using a markup language is depicted in FIG. 3. The hierarchical structure 302 is formed using the markup language to control a structure of objects included in the content as they relate to each other. The hierarchical structure 302, for instance, includes tags that specify hierarchical containment and nesting structures to organize objects.

In this example, once the data describing the hierarchical structure 210 is obtained, a z-order determination module 212 is utilized to determine a z-order of the plurality of objects, one to another, based on the hierarchical structure (block 906) which is output as z-ordering data 214. The z-order determination module 212, for instance, maps the hierarchical containment and nesting structures described in the hierarchical structure 210 to nodes in a tree-like graphical structure. For the example of FIG. 3, this creates a root node 304, a first child node 306 that is ordered from the root node 304, and a second child node 308 is ordered after the first child node 306. The background object 310 is mapped to the root node 304, a first foreground object 312 as a picnic table is mapped to a first child node 306, and a second foreground object 314 of a dog is mapped to a second child node 308. From this, the z-ordering of the objects as relating to each other is readily determined.

An object view determination module 216 is also employed by the digital content view control system 116 to generate a plurality of object views 218 (e.g., perspective object views) of individual objects that are selectable via the user interface 110 (block 908). The object views 218 are configurable in a variety of ways to exhibit arrangement of the objects 118 according to the z-order. An example of this is perspective object views using multipoint perspective.

Linear perspective is used to display the objects on a flat planar surface. To exhibit depth in linear perspective, a size of the objects is decreased as distance from an observer increases. Linear perspective includes a single vanishing point for an image plane, at which, parallel lines from a ground plane converge. Thus, in this example the observer is positioned at a point that is orthogonal to the image plane.

Multipoint perspective includes two or more vanishing points. Multipoint perspective is usable to depict the same objects as in a linear perspective, but show those objects rotated as shown in FIG. 5. FIG. 5 includes a ground plane 502 having parallel lines that, when intersecting an image plane 504, converge at a vanishing point 506. As illustrated, an observer in this example views the image plane 504 "from the side."

At the second stage 404 of FIG. 4, examples or perspective object views 406, 408, 410 are depicted as rendered in the user interface 110 based on a multipoint (e.g., two point) perspective. Each of the perspective object views 408-410 employ first vanishing points that define depth "within" the objects, e.g., for a horizon of a park of the background object. The perspective object views 408-410 also employ a second vanishing point for the image plane of the objects along which the objects are positioned. As illustrated, this causes a right side of the object views to appear smaller and further away from the observer than a left side of the object views based on the second vanishing point, e.g., as exhibited by the top and bottom lines of the object views that while parallel appear to converge at this vanishing point.

A view arrangement module 220 is then employed to generated ordered object views 222 by arranging and spacing the plurality of perspective object views, one to another, according to the z-order (block 910). Continuing with the example above, the object views 218 are defined in relation to an angle, e.g., forty-five degrees with respect to a Y axis. This angle may be set as a default, specified via a user input (e.g., entered as an amount, through interaction with a control 412 depicted as a slider), and so on. Further, the object views 218 are spaced, one to another, in the user interface 110. This is also performable based on a default amount, based on available spacing and number of views within the user interface 110, through interaction with the control 412 to increase or decrease spacing, and so forth.

The ordered object views 222 are then rendered by a rendering module 224 for display in a user interface 110 by a display device 112 (block 912), e.g., as perspective object views. This rendering is performable in a variety of ways to support a corresponding variety of functionality. For example, a digital content navigation module 226 is configured to support navigation to (i.e., selection of) particular objects using the perspective object views. In another example, a digital content editing module 228 is configured to support editing to individual objects using the perspective object views.

FIG. 6, for instance, depicts an example using first and second stages 602, 604. At the first stage 602, the first, second, and third perspective objects 406, 408, 410 are rendered as discussed in relation to FIG. 4. A user input is received via the user interface 110 that selects the third perspective object 410 to change its z-ordering to between the first and second perspective objects 408, 410.

Another user input is selected via the option 130 to toggle between the multipoint perspective view of the first stage 602 to a linear perspective view of the second stage 604, which may be repeated to return to the linear perspective view. As illustrated, this causes the dog to appear behind the picnic table in the digital content. Further, the option 130 supports an efficient technique to select a particular object view from the multipoint perspective view without the "cycling" involved in conventional techniques.

Continuing the example above the digital content editing module 228 is configured to support editing of the objects through interaction with the perspective object views. Rearrangement of the objects in the z-ordering above causes the dog to appear behind the picnic table as shown at the second stage 404 of FIG. 4. Accordingly, in this example the third perspective view 410 is selected at the first stage 702 of FIG. 7 to enter into an editing view.

The second stage 704 includes an example of the editing view having a content view portion 706, a perspective view portion 708, and an editing portion 710. The editing portion 710 is configured to display objects corresponding to the perspective view portion selected at the first stage 702. Edits are then made to this portion without directly affecting other objects in the digital content 106, e.g., such as to resize and reposition the dog.

An effect of those edits made to the editing portion 710 are also made to the digital content 106 in real time as these edits are received. In this way, the editing view supports selection of particular perspective object views via the perspective view portion 708, which are output in the editing portion 710 for editing. An indication 712 is also provided via the user interface by changing a display characteristic of the perspective object views to indicate which view is currently selected for editing.

FIG. 8 depicts another example of an editing view. In this example, the first stage 802 includes the first, second, and third perspective views 406, 408, 410 arranged as described in relation to the second stage 404 of FIG. 4. The third perspective view 410 is again selected for editing.

In this example, however, as shown at the second stage 804 a stack arrangement editing view is entered. Selection of the third selected perspective view 410, for instance, causes the corresponding digital object 806 of the dog to be output in the user interface 110 in a linear perspective. The first and second perspective views 406, 408 are also included in the user interface 110, and are selectable to navigate to corresponding objects for editing. Thus, in this example positioning within the z-order is illustrated while still supporting edits to individual objects. This editing view is also configurable to support additional portions, such as the content view portion 706 of FIG. 7 to depict an effect of the edits on the digital content 106 as a whole in real time as those edits are received. In these examples, user inputs received via the user interface 110 are used to control output of the perspective object views. Other examples are also contemplated, including use of sensors which are described as follows.

FIG. 10 depicts an example implementation in which detection of a change in orientation of a computing device 102 in three-dimensional space is utilized to control switching between a linear perspective and a multipoint perspective view of objects in digital content. The computing device 102 in this example includes an orientation determination module 1008 having sensors 206 that are configured to generate orientation data 1010 responsive to detecting an orientation and/or a change in orientation of the computing device 102 in three-dimensional space.

The computing device 102 is illustrated in this example as having a portable form factor that includes a housing 1006, on which, the display device 112 is disposed. The sensors 206, for instance, are configurable as an accelerometer, passive infrared sensor, gyroscope, digital camera, ultrasonic sensor, microwave sensor, tomographic sensor, or any other type of sensor that is configured to detect a multiaxis orientation or a change in multiaxis orientation of the computing device 102. The sensors 206, as disposed within the housing 1006, are configured to detect orientation and/or changes in orientation. This orientation is inferred to occur with respect to the housing 1006 and corresponding display device 112, and as such, an orientation determination module 1008 is configured to determine "how" the digital content is viewed via the user interface 110.

Through use of this data, the digital content view control system 116 is configured to toggle between a linear perspective as illustrated as the first stage 1002 and a multipoint perspective as illustrated at the second stage 1004. At the first stage 1002, for instance, the digital content view control system 116 detects a first orientation of the housing 1006 as disposed in three-dimensional space using the sensor 206 (block 1102). This first orientation, for instance, is configured such that a viewpoint of the computing device 102 (and more particularly the display device 112) is disposed orthogonal to a surface of the display device 112. Accordingly, the user interface 110 is displayed as having a plurality of objects included as part of the digital content in a linear perspective view (block 1104).

At the second stage 1004, the housing 1006 of the computing device 102 is moved to a second orientation. In response, the second orientation of the housing 1006 as disposed in three-dimensional space is detected using the sensor 206 (block 1106). The user interface 110 is then configured by the digital content view control system 116 to have the plurality of objects displayed in multipoint perspective view (block 1108). In this example, multipoint perspective views of the objects are generated as described above. These views are also spaced apart from each other to indicate a z-ordering. For example, the text "Lucy Dog Treats!!" and the "Buy Now" button are arranged in a first layer, the dog is arranged in a second layer, and the tree is arranged in a third layer.

These views are configured such that the different objects appear to "float" above the screen. In one example, this is performed through use of a multipoint perspective of the views that differs from a perspective, at which, the display device 112 and user interface 110 appear to the user. In other words, a vanishing point used to define an image plane for the views differs from a vanishing point of the device, itself. In this way, movement of the computing device 102 as a whole is used to efficiently toggle between these views and addresses the challenges of a small form factor employed by portable devices.

Example System and Device

Figure 12:
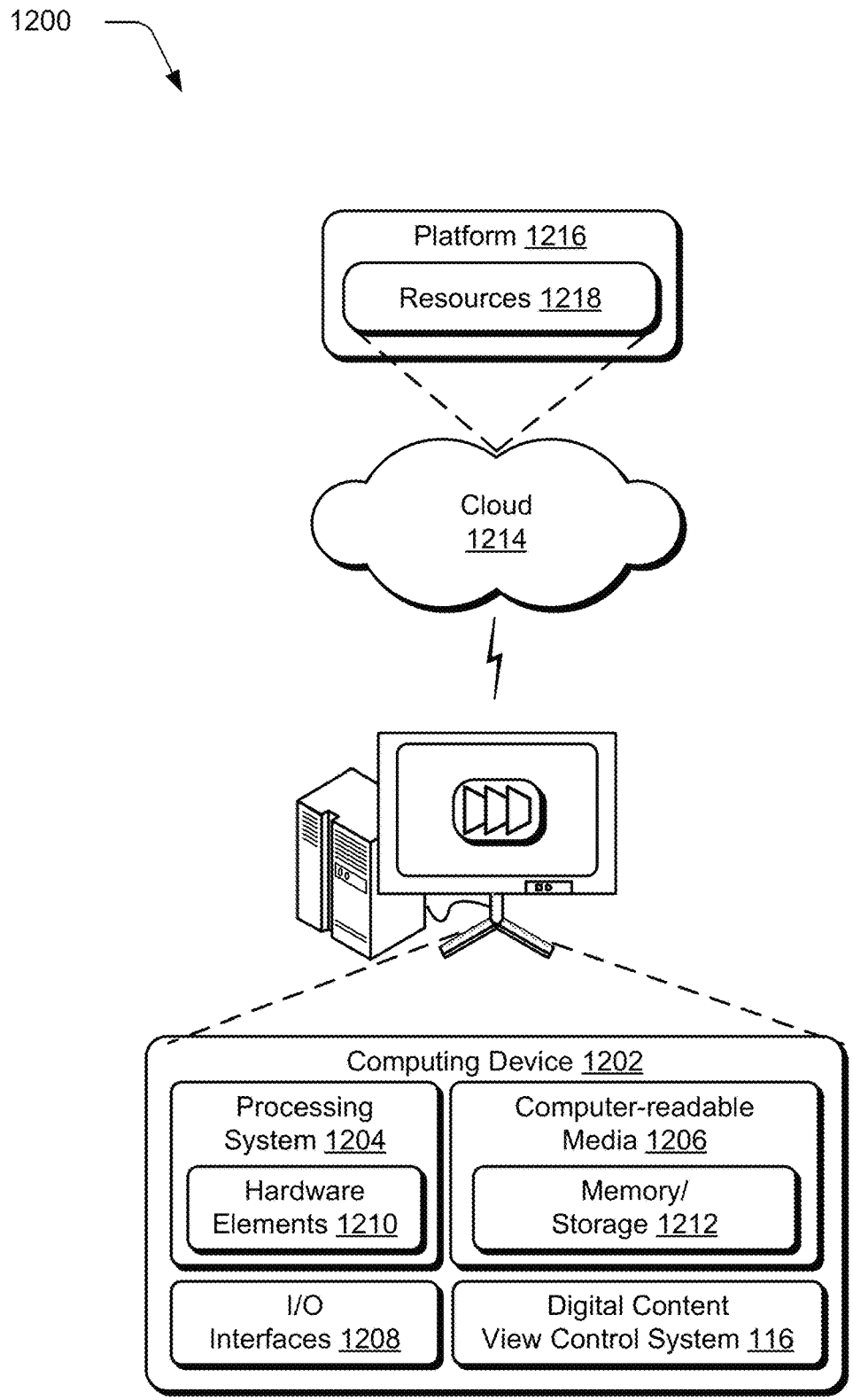
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that implement the various techniques described herein. This is illustrated through inclusion of the digital content view control system 116. The computing device 1202 is configurable, for example, as a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that is configurable as processors, functional blocks, and so forth. This includes implementation in hardware as an application specific integrated circuit or other logic device formed using one or more semiconductors. The hardware elements 1210 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1206 is illustrated as including memory/storage 1212. The memory/storage 1212 represents memory/storage capacity associated with one or more computer-readable media. The memory/storage 1212 includes volatile media (such as random access memory (RAM)) and/or nonvolatile media (such as read only memory (ROM), Flash memory, optical disks, magnetic disks, and so forth). The memory/storage 1212 includes fixed media (e.g., RAM, ROM, a fixed hard drive, and so on) as well as removable media (e.g., Flash memory, a removable hard drive, an optical disc, and so forth). The computer-readable media 1206 is configurable in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1202. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1202, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1210. The computing device 1202 is configured to implement particular instructions and/or functions corresponding to the software and/or hardware modules. Accordingly, implementation of a module that is executable by the computing device 1202 as software is achieved at least partially in hardware, e.g., through use of computer-readable storage media and/or hardware elements 1210 of the processing system 1204. The instructions and/or functions are executable/operable by one or more articles of manufacture (for example, one or more computing devices 1202 and/or processing systems 1204) to implement techniques, modules, and examples described herein.

The techniques described herein are supported by various configurations of the computing device 1202 and are not limited to the specific examples of the techniques described herein. This functionality is also implementable all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 abstracts resources and functions to connect the computing device 1202 with other computing devices. The platform 1216 also serves to abstract scaling of resources to provide a corresponding level of scale to encountered demand for the resources 1218 that are implemented via the platform 1216. Accordingly, in an interconnected device embodiment, implementation of functionality described herein is distributable throughout the system 1200. For example, the functionality is implementable in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. An apparatus comprising:
   a housing;
   at least one sensor disposed within the housing;
   a display device disposed upon the housing;
   a processing system disposed within the housing; and
   a computer-readable storage medium disposed within the housing having digital content and stored instructions, the instructions configured that, responsive to execution by the processing system, causes the processing system to perform operations including:
   detecting a first orientation of the housing as disposed in three-dimensional space using the at least one sensor;
   displaying, responsive to the detecting of the first orientation, a user interface having a plurality of objects included as part of the digital content in a flat planar arrangement;
   detecting a second orientation of the housing as disposed in the three-dimensional space using the at least one sensor; and
   displaying, responsive to the detecting of the second orientation, the user interface having the plurality of objects in an exploded view that includes multipoint perspective views of the plurality of objects that are configured to display the digital content as floating above the display device, wherein:
   a respective multipoint perspective view of the multipoint perspective views is selectable to cause display, concurrently with displaying the user interface having the plurality of objects in the exploded view, of a respective object in a separate portion of the user interface for editing; and an effect of edits on the digital content is depicted in real time as the edits are received.

2. The apparatus as described in claim 1, wherein the at least one sensor is configured to detect the first orientation and the second orientation as occurring in the three-dimensional space.

3. The apparatus as described in claim 1, wherein the at least one sensor is an accelerometer, passive infrared sensor, gyroscope, digital camera, ultrasonic sensor, microwave sensor, or tomographic sensor.

4. The apparatus as described in claim 1, wherein the at least one sensor is configured to detect an angle, at which, the housing is disposed.

5. The apparatus as described in claim 1, wherein the exploded view depicts the plurality of objects as spaced apart and following a z-ordering as defined by a hierarchical structure specified in the digital content.

6. The apparatus as described in claim 1, wherein the at least one sensor is any type of sensor that is configured to detect a multiaxis orientation or a change in multiaxis orientation of the housing.

7. The apparatus as described in claim 1, wherein the at least one sensor is configured to determine how the digital content is viewed in the user interface.

8. The apparatus as described in claim 1, wherein the detecting the first orientation and the detecting the second orientation cause toggling between the displaying the user interface in the flat planar arrangement and the displaying the user interface in the exploded view.

9. The apparatus as described in claim 8, further comprising receiving an input via the user interface changing a vanishing point and further comprising displaying the user interface having the plurality of objects in the exploded view based on the changed vanishing point.

10. The apparatus as described in claim 1, wherein the multipoint perspective views of the plurality of objects differ from a perspective that the user interface is displayed.

11. An apparatus comprising:
at least one sensor;
a display device;
a processing system; and
a computer-readable storage medium having digital content and stored instructions, the instructions configured that, responsive to execution by the processing system, causes the processing system to perform operations including:
detecting a change in a three-dimensional orientation by the at least one sensor; and
responsive to the detecting, toggling between:
a linear perspective of objects included as part of the digital content that are displayed in a user interface by the display device;
and
a multipoint perspective of the objects included as part of the digital content that are displayed in the user interface by the display device, the multipoint perspective including multipoint perspective views that are configured to display the digital content as floating above the display device, wherein:
a respective multipoint perspective view of the multipoint perspective views is selectable to cause display, concurrently with displaying the multipoint perspective, of a respective object in a separate portion of the user interface for editing; and
an effect of edits on the digital content is depicted in real time as the edits are received.

12. The apparatus as described in claim 11, wherein the at least one sensor is any type of sensor that is configured to detect a multiaxis orientation or a change in multiaxis orientation of the display device.

13. The apparatus as described in claim 11, wherein the at least one sensor is configured to determine how the digital content is viewed in the user interface.

14. The apparatus as described in claim 11, wherein detecting a first orientation and detecting a second orientation cause the toggling between the displaying the user interface in the linear perspective and the displaying the user interface in the multipoint perspective.

15. The apparatus as described in claim 14, further comprising receiving an input via the user interface changing a vanishing point and further comprising displaying the user interface having a plurality of objects in the multipoint perspective based on the changed vanishing point.

16. The apparatus as described in claim 11, wherein the multipoint perspective views are configured for the objects included as part of the digital content to display the objects as floating above the display device.

17. A method implemented by a computing device, the method comprising:
detecting, by at least one sensor, a first orientation of a housing as disposed in three-dimensional space;
displaying, by a display device disposed on the housing responsive to the detecting of the first orientation, a user interface having a plurality of objects included as part of digital content in a flat planar arrangement;
detecting, by the at least one sensor, a second orientation of the housing as disposed in the three-dimensional space; and
displaying, by the display device disposed on the housing responsive to the detecting of the second orientation, the user interface having the plurality of objects in an exploded view that includes multipoint perspective views of the plurality of objects that are configured to display the digital content as floating above the display device, wherein:
a respective multipoint perspective view of the multipoint perspective views is selectable to cause display, concurrently with displaying the user interface having the plurality of objects in the exploded view, of a respective object in a separate portion of the user interface for editing; and
an effect of edits on the digital content is depicted in real time as the edits are received.

18. The method as described in claim 17, wherein the at least one sensor is configured to detect the first orientation and the second orientation as occurring in the three-dimensional space.

19. The method as described in claim 17, wherein the detecting the first orientation and the detecting the second orientation cause toggling between the displaying the user interface in the flat planar arrangement and the displaying the user interface in the exploded view.

20. The method as described in claim 17, wherein a vanishing point that defines an image plane of the multipoint perspective views of the plurality of objects differs from a vanishing point of the display device.

\* \* \* \* \*